(12) United States Patent
Pryce et al.

(10) Patent No.: US 7,257,597 B1
(45) Date of Patent: Aug. 14, 2007

(54) TABLE SUBSTITUTION

(75) Inventors: Alex Pryce, Toronto (CA); Jeffrey Boyd, Schomberg (CA); Scott Kurinskas, San Carlos, CA (US)

(73) Assignee: Siebel Systems, Inc., San Mateo, CA (US)

( * ) Notice: Subject to any disclaimer, the term of this patent is extended or adjusted under 35 U.S.C. 154(b) by 810 days.

(21) Appl. No.: 10/234,417

(22) Filed: Sep. 3, 2002

Related U.S. Application Data

(60) Provisional application No. 60/342,058, filed on Dec. 18, 2001.

(51) Int. Cl.
*G06F 17/00* (2006.01)
*G06F 7/00* (2006.01)

(52) U.S. Cl. .................... 707/102; 707/10; 707/101

(58) Field of Classification Search ............... 707/1–2, 707/100–102; 709/216
See application file for complete search history.

(56) References Cited

U.S. PATENT DOCUMENTS 5,564,113 A * 10/1996 Bergen et al. .................. 707/4
6,389,429 B1 * 5/2002 Kane et al. ................. 707/200
6,529,921 B1 * 3/2003 Berkowitz et al. ....... 715/500.1
6,970,880 B2 * 11/2005 Camarillo ................... 707/102
2002/0055932 A1 * 5/2002 Wheeler et al. ......... 707/104.1

OTHER PUBLICATIONS

"Metadatabase solutions for enterprise information integration problems", Cheng Hsu and Laurie Rattner, Jan. 1993 ACM SIGMIS Database, vol. 24, issue 1.*

* cited by examiner

*Primary Examiner*—Chong H. Kim
*Assistant Examiner*—Susan Rayyan
(74) *Attorney, Agent, or Firm*—Campbell Stephenson LLP

(57) ABSTRACT

A method and system that enables data to be shared across application systems via a table substitution scheme. Tables are identified in the legacy application system that are candidates for substitution of tables in the core application system containing similar data. Table structure meta data corresponding to these "substituted" tables are then extracted from the legacy system schema, and stored in a repository. In accordance with the meta data, business logic is defined to remap columns in the core tables to corresponding columns in the substituted tables. Accordingly, when the core application system performs data access (e.g., reads, inserts, updates, etc.), it accesses the remapped columns in the substituted tables instead of original columns in the core tables. At the same time, the legacy application system is enabled to concurrently access the substituted tables without require any changes to the business logic of the legacy application system.

25 Claims, 11 Drawing Sheets

BUSINESS SERVICE METHOD OBJECT DEFINITION:
   • NAME: (ARBITRARY METHOD NAME) ~124
124 ~ BUSINESS SERVICE METHOD ARG OBJECT DEFINITION # 1:
   • NAME: TABLENAME
   • OPTIONAL: FALSE
   • TYPE: INPUT
   • DATA TYPE: STRING
126 ~ BUSINESS SERVICE METHOD ARG OBJECT DEFINITION # 2:
   • NAME: KEY
   • OPTIONAL: FALSE
   • TYPE: OUTPUT
   • DATA TYPE: HIERARCHY

120

TABLE SUBSTITUTION

RELATED APPLICATIONS

The present application is based on a co-pending provisional application entitled "TABLE SUBSTITUTION," Ser. No. 60/342,058, filed on Dec. 18, 2001, the benefit of the filing date of which is claimed under 35 U.S.C. § 119(e).

BACKGROUND OF THE INVENTION

1. Field of the Invention

The present invention relates to data systems in general, and, in more particular, a mechanism for substituting tables such that two separate enterprise applications may access the same tables using a common database instance.

2. Background Information

There are many instances in which corporate enterprises spend a large amount of resources supporting a particular software application or suite of applications. Oftentimes, such software applications are proprietary and do not provide interfaces that enable other applications to access data stored by the applications. Typically, in order to enhance performance (e.g., through faster operation or new features) the corporate enterprise must continue to purchase new versions of the applications and/or purchase productivity tools from the software vendor who produces the application or a third party that provides such tools. In other instances, new enhancements may be provided by in-house IT staff.

With the emergence of e-business and the exponential growth of information technology, new techniques and methodologies have been developed to enhance the performance of business applications and integrated application systems in a wide range of industries, including manufacturing, marketing, and sales. In most instances, the new techniques and methodologies are implemented using new applications that store data in particular formats that are optimized for use with those applications. Generally, these data formats and architectures correspond to different data models that are defined in a manner that makes it impractical or impossible to share data between applications. This becomes particularly problematic for those enterprises that have been using a certain application or application systems for years, such as a manufacturing processing tool or a large customer database application, and have a great deal of data that has been generated through use of the tool or application and stored in a large data store: the new improved tool or application cannot access the existing data in a reliable or useful manner, and years or even decades of information must be re-entered into the new system.

Ideally, it would be beneficial to enable both existing and new application systems to share the same data. One approach to this end is to periodically "synchronize" the data in both system databases through a replication process, wherein table data are exported from each of the respective databases and imported into the other database using specially developed business logic on both ends that reconfigures the imported data to meet the native format used in each system's data model. In general, this is a burdensome task, both in developing the special business logic and administrating the replication process. It also adds overhead to each database, as large imports and exports are very transaction intensive. Furthermore, in reality the databases are never fully synchronized, since each export represents a "snapshot" of the data in each table at the time that data is retrieved by the export tool, which will have changed by the time the replication process is completed.

SUMMARY OF THE INVENTION

A method and system that enables data to be shared across a legacy application system and a new "core" application system via a table substitution scheme. Tables are identified in the legacy application system that are candidates for substitution of tables in the core application system containing similar data. Table structure meta data corresponding to these "substituted" tables are then extracted from the legacy application system schema, and stored in a repository. In accordance with the meta data, business logic is defined to remap columns in the core tables to corresponding columns in the substituted tables. Accordingly, when the core application system performs data access (e.g., reads, inserts, updates, etc.), it accesses the remapped columns in the substituted tables instead of original columns in the core tables. At the same time, the legacy application system is enabled to concurrently access the substituted tables without require any changes to the business logic of the legacy application system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

A system and method for "substituting" tables is described in detail herein. In the following description, numerous specific details are disclosed to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention addresses the non-compatibilities and replication problems in the prior art though the use of a table substitution scheme that enables both an existing "legacy" application system and a new "core" application system to access (i.e., read, insert, update, and delete) data from a common data store. In accordance with one embodiment, the business logic implemented in the legacy application system remains exactly the same, enabling use of that system to remain the same as before. Furthermore, access of the data store by the new core application system appears transparent to the legacy data system. In accordance with the invention, the new core application system is able to substitute legacy tables from the common data store in place of corresponding tables in its own data model that would normally be used to store similar information in a manner that enables various software components designed for the data model, such as user interfaces, to remain either unchanged, or require minimal changes. As a result, the risk of migrating to the new application systems is greatly reduced, as both the new core and legacy systems are enabled to share data from the common data store, while not requiring abandonment of the legacy application system.

Figure 1:
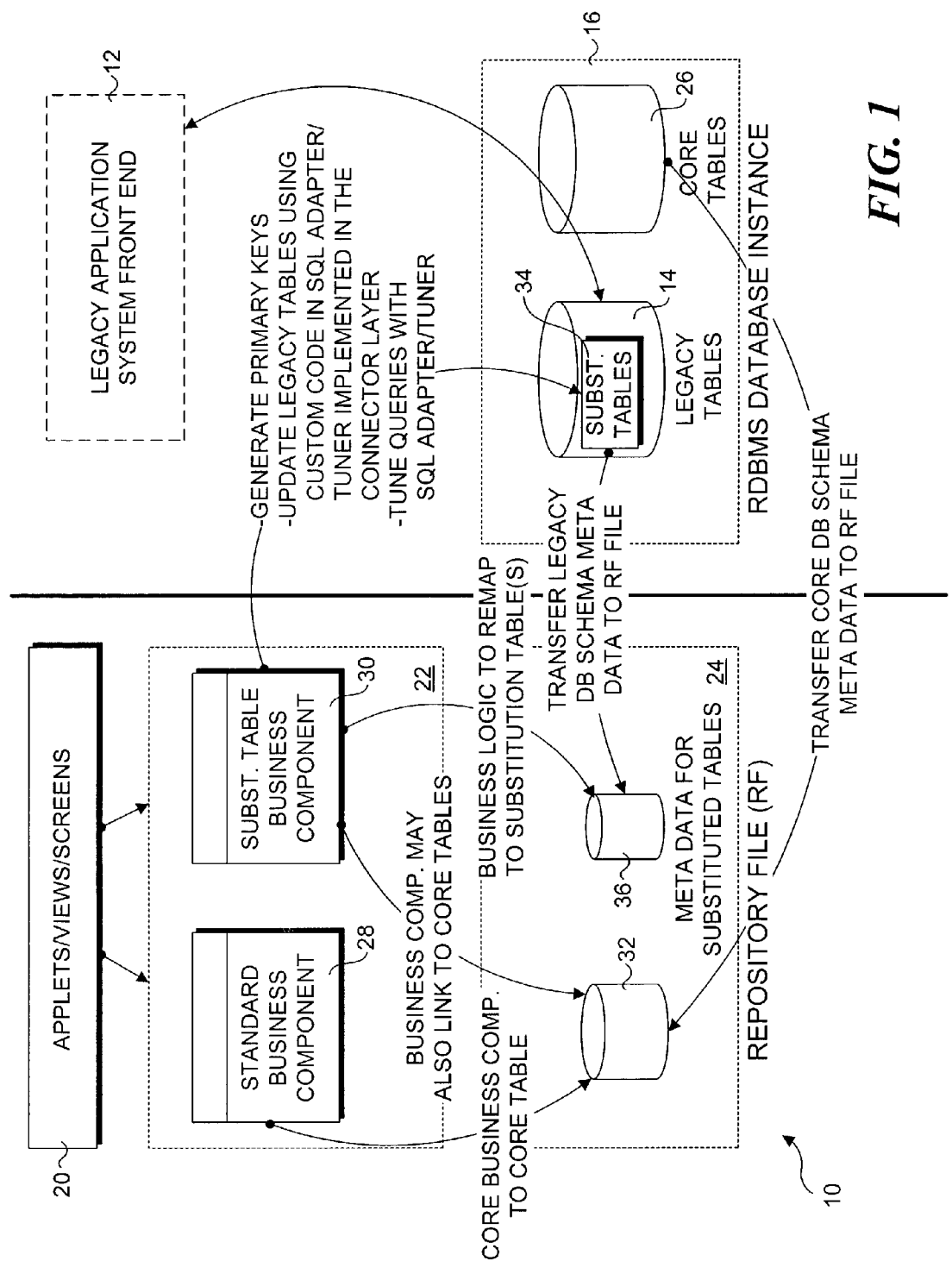
FIG. 1 is a block schematic diagram illustrating a high level architecture corresponding to a table substitution scheme in accordance with one embodiment of the present invention.

A high level architecture 10 corresponding to one embodiment of the invention is shown in FIG. 1. Architecture 10 includes portions corresponding to a new core application system whose components are substantially contained on the left-hand side and a legacy application system whose components are contained on the right-hand side. As used herein, objects pertaining to the legacy data system are termed "legacy" or "external" objects, while, objects pertaining to the new core application system are termed "core" objects. The legacy application system includes a legacy application system front-end 12 that accesses data from legacy tables 14 stored in an RDBMS (relational database management system) database instance 16. Typically, RDBMS database instance 16 corresponds to a single instance of an RDBMS database that is served by appropriate RDBMS database server software. As defined herein, a single database instance means that there exists a single physical instance of the data stored in the database, but does not require that a single machine run the database server software.

The core application system includes various user-interface components 20, a business component layer 22, and a repository file 24, which collectively enable users to access various data stored in core tables 26 on RDBMS database instance 16. The business component layer contains a plurality of business components, depicted as a standard business component 28 and a substituted table business component 30. As explained below in further detail, the business component layer forms a layer of abstraction between user-interface components 20 and core tables 26, and enable the user-interface components to access data stored in the core tables via business rules and logic defined by the business components and various meta data and business rules stored in repository file 24, including core database schema meta data 32 corresponding to the data model used by the core application system.

Figure 2:
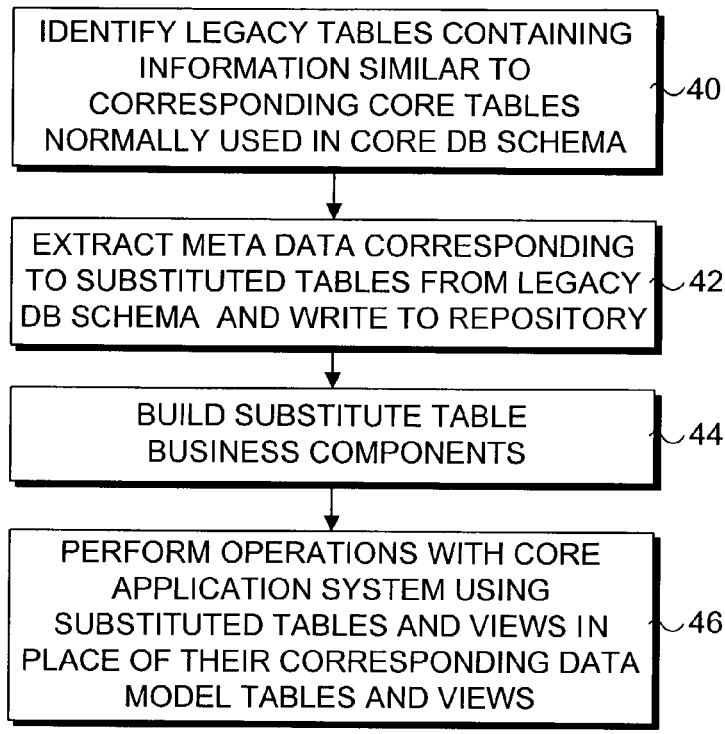
FIG. 2 is top-level flowchart illustrating the basic operations performed under the table substitution scheme of FIG. 1.

With reference to a block 40 in the flowchart of FIG. 2, the first step in the table substitution scheme is to identify which of legacy tables 14 (the substitution tables) already contain information similar to that which would be found in a corresponding table among core tables 26 in accordance with the original data model of the core application system. For example, this information may include contact data, company data, opportunity data, or any data that is common to the both application systems. It is noted that under appropriate situations, legacy views (or new views built on legacy tables) may also be substituted for core tables. These tables and views are collectively depicted as substitution tables 34.

Once the substitution tables and views are identified, meta data describing the portion of the legacy database schema corresponding to the tables and views is extracted from the RDBMS database instance and copied into repository 24 in a block 42, as depicted by meta data for substitution tables 36. Next, in a block 44, substitute table business components that enable access to the substituted tables (and/or views) are built. In general, the substitute table business components should have the behavior of the standard business components used in the core application system. In addition to being based upon substitute tables and views, the substitute table business components may be joined to core tables as well. Further details of this process are provided below. After the business components have been built, the core application system is enabled to perform its normal operations using the substituted tables and views in place of its "normal" tables and views corresponding to its data model, as depicted by a block 46.

Meta data is extracted from the legacy tables and written to the repository file through use of a tool called the External Table Schema Import (ETSI) utility. In one embodiment, ETSI is a business service that is run as a batch process. The purpose of ETSI is to import schema information describing non-core application tables (i.e., legacy tables used for the substituted tables) into the repository file. The substituted tables will then be visible as table objects to various tools provided by the core application system.

Figure 3:
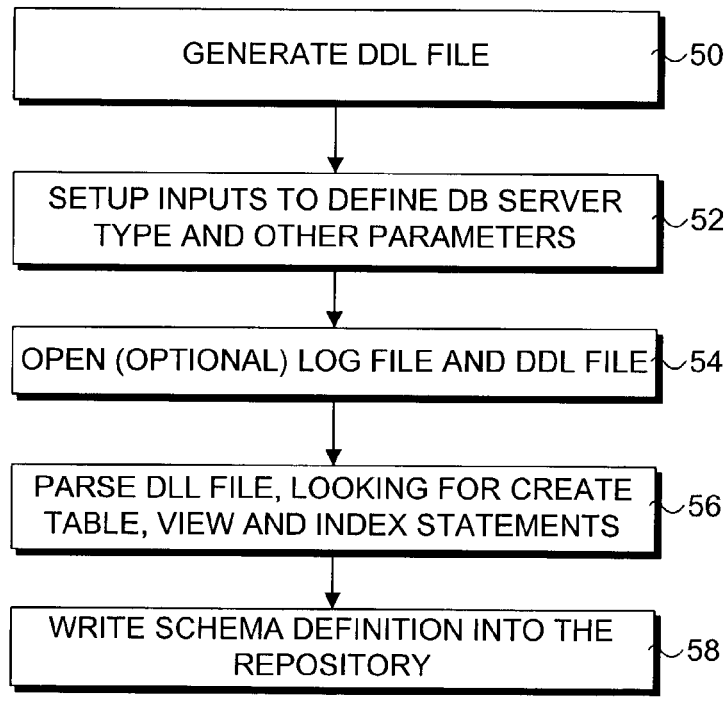
FIG. 3 is a flowchart illustrating various operations that are performed when exporting meta data pertaining to a legacy table that is to be used as a substituted table in a core application system schema.

With reference to FIG. 3, the import process begins in a block 50 in which a DDL (Data Definition Language) file is generated corresponding to the legacy tables and views to be used as substituted tables and any indexes built on those tables as defined by the legacy database schema. Generally, this will require connecting to the RDBMS database instance 16 and extracting an appropriate set of DDL statements into an ASCII file. Tools for performing these operations are typically provided by the database server software vendor or third parties. Optionally, this information may be extracted by querying the meta data tables in the database.

Next, the ETSI utility is launched, and, setup inputs to define the DB server type and various other parameters are provided in a block 52. Since each of these database vendors use different extensions beyond the standard SQL syntax for defining meta data, the particular type of DDL file must be specified. Other setup parameters include the names and file paths of the DDL file, the repository file, and an optional log file, and the name of a project to which the external table definitions will be added. The optional log file and DDL file are then opened in a block 54.

At this point, the ETSI utility parses the DDL, looking for CREATE TABLE, CREATE VIEW, and CREATE INDEX statements. Appropriate object structures corresponding to the tables, views, and indexes are then extracted from the DDL file and written to the repository file in a block 58. During this process, progress and any error messages will be written to the screen and the log file (if one was selected).

Appropriate information corresponding to the table, view, and index DDL structures is then written to the repository. In one embodiment, the structure data is stored in separate groupings comprising table header data, table column data, index header data, and index column data. In one embodiment, these data are stored as sets of table fields in the repository file.

When parsing the DDL file, some of the SQL definition will be ignored, since generally only the basic SQL structure information needs to be imported.

The core application system uses meta data, including core DB schema meta data 32 and legacy DB schema meta data 36, to enable other components in the system to determine the structure of the data model used to stored data in the system. In particular, this information is used by the business components to abstract the actual storage of the data from business objects that are used to provide user interaction with the system in a manner that enables the underlying data model to change without requiring any corresponding changes to the business objects (only the business components are changed).

Figure 4:
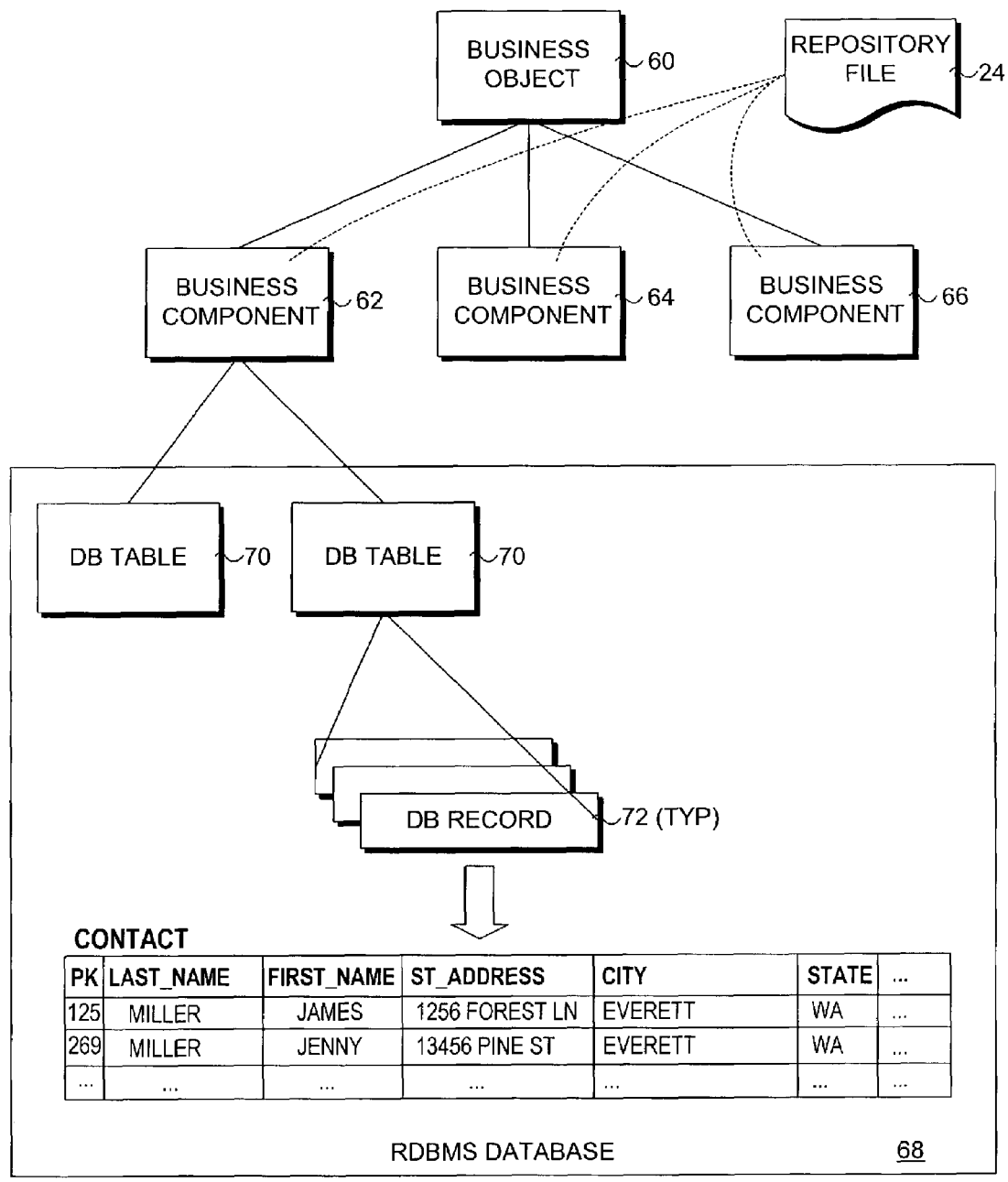
FIG. 4 is a block diagram illustrating the hierarchical relationship between business objects, business components, database tables, and database records.

A multi-layer architecture illustrating the relationships between business objects, business components, and database tables is shown in FIG. 4. A business object 60 sitting at the top layer passes various database access requests to business components 62, 64, and 66 to retrieve data pertaining to the business object from a database 68. For example, business object 60 may pertain to an opportunity object and business components 62, 64, and 66 are used to access data in database 68 pertaining to opportunities.

In one aspect, business components are objects that span data from one or more physical database tables and calculated values by referencing a base table and explicitly joining and linking other tables, including intersection tables, as depicted by tables 70, each of which include a plurality of records 72. As explained in further detail below, each business component contains information for mapping to various data stored in those tables. More specifically, these mappings are between a requested object, such as a contact, and information pertaining to that object that are stored in the database table(s) to which the business component corresponds.

Figure 5:
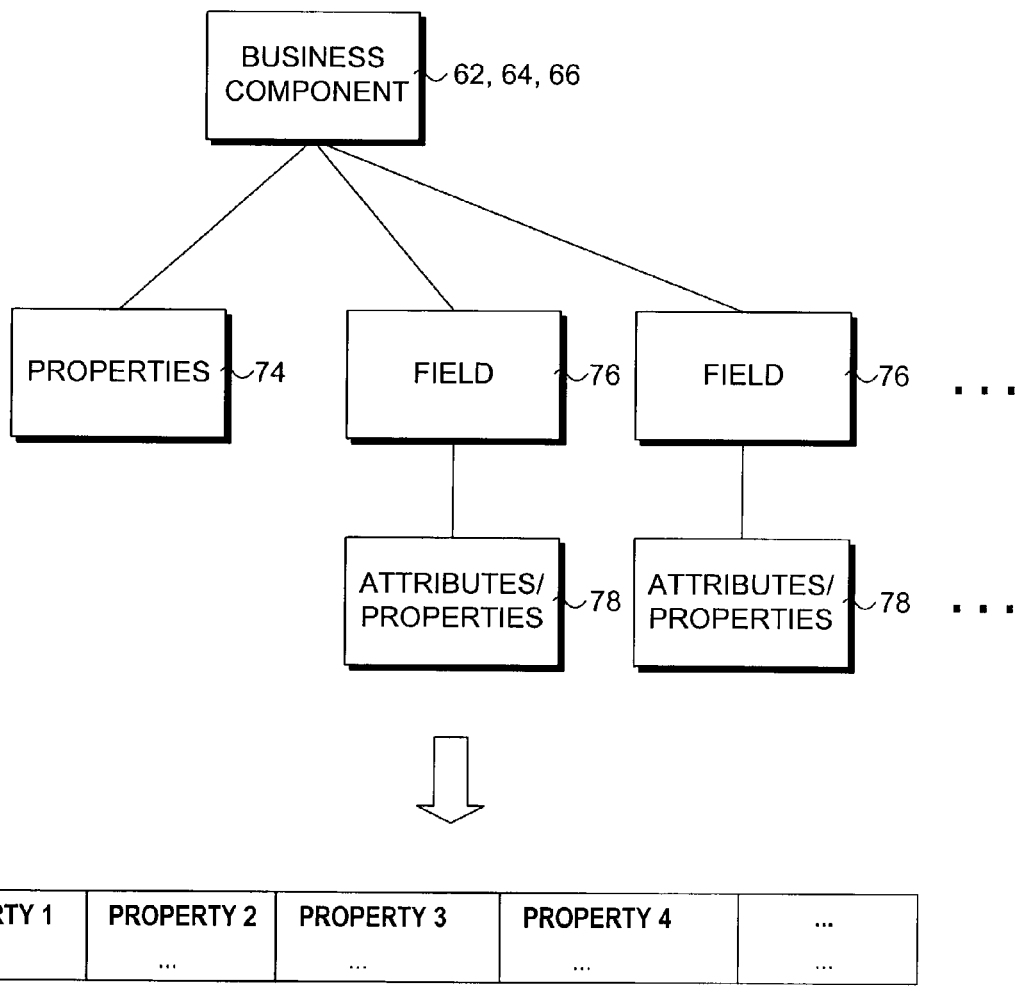
FIG. 5 is a block diagram illustrating further details of a business component.

A block diagram of a logical structure of a business component in accordance with one embodiment of the invention is shown in FIG. 5. Each business component (e.g., 62, 64, 66) may include a set of properties 74 that pertain to the respective business component (e.g., NAME, which specifies the logical name of the business component, TABLE NAME, which specifies the actual name of the underlying table, etc.). A business component also includes a set of fields 76, each of which may have a set of associated attributes or properties 78. For example, a field may include a NAME property that identifies the name of the field, a COLUMN NAME property that identifies the column of the underlying table to which the respective field is mapped, etc.

In one embodiment, every standard business component (i.e., the business components used by the core application system when only core tables 26 are used) has system fields based on special columns in the base, joined, and linked tables. In most cases, the will be no direct equivalent of the special system columns in the substituted tables. Various examples of these columns are shown below in TABLE 1.

TABLE 1

| CONTACT<br>(Standard Core Table) | CONTBL<br>(Sample Legacy Table) |
| --- | --- |
| ROW_ID | No Equivalent, use "" |
| CREATED | WHEN_CREATED |
| CREATED_BY | WHO_CREATED |
| CONFLICT_ID | No Equivalent, use "" |
| LAST_UPD_BY | WHO_UPDATED |
| LAST_UPD | WHEN_UPDATED |
| MODIFICATION_NUM | No Equivalent, use "" |

These system fields in the business components are referred to by their respective names: "Id," "Created," "Created By," "Conflict Id," "Updated By," "Updated," and "Mod Id."

In one embodiment, all of the core application system's source code (i.e., software objects that sit above the business component layer) assumes the mandatory presence of the fields listed in TABLE 1. However, at least a portion of these fields will not exist in the legacy tables. This presents a problem: the fields are required on the one hand, but don't exist, and the legacy tables cannot be modified to include them. Furthermore, the fields are not described in the repository since they don't exist in the legacy tables.

Embodiments of invention address this problem by adding the fields to the business component definitions at run time, such that the fields function as pseudo columns. As a result, the pseudo columns appear to exist to the core source code, but are transparent to the legacy application system since they don't actually exist in a physical table.

The business components based on the substituted tables will be created as part of the Table Substitution implementation. The differences from the process of creating a business component based on standard core tables are as follows:

1) No business component fields are created for the system column equivalents in the external table;

2) All the special system columns must be mapped to their equivalents for all the tables participating in the business component. The mapping is configured by entering Business Component Props with Name "System Field:<system field name>" and Value containing the corresponding column in the external table, or blank, if none exists. For example, (using the column mapping above in TABLE 1):

Name will have: "System Field:Created By"

Value will have: "WHO_CREATED"

Figure 6:
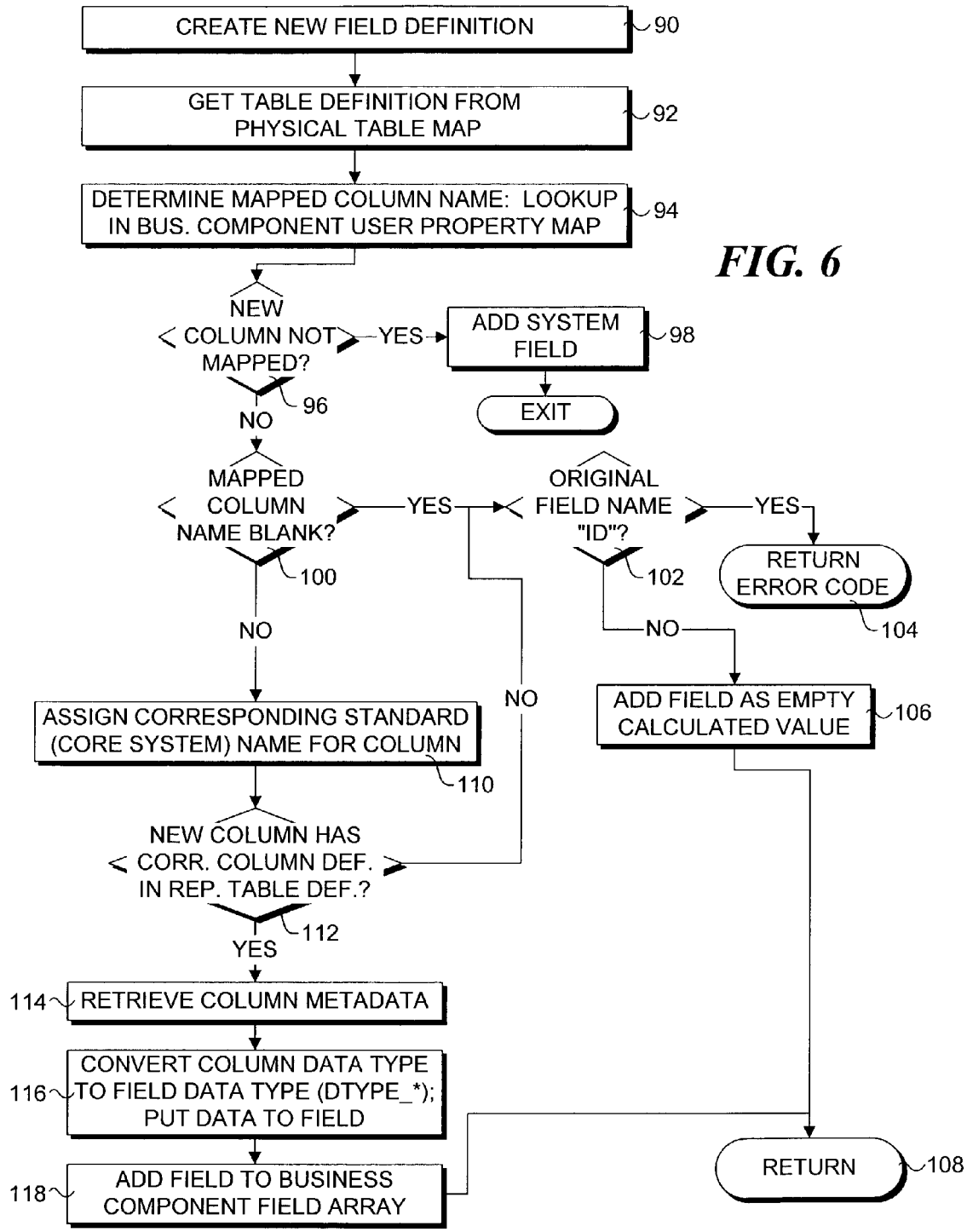
FIG. 6 is a flowchart illustrating the logic used by one embodiment of the invention when building business components that are used to interface with corresponding substituted tables.

Further details of this process are presented in the flowchart of FIG. 6, which begins with a new field definition being created in a block 90. The table definition from the physical table name is then retrieved in a block 92, and the mapped column name is determined in a block 94 by looking it up in the business component user property map. The logic then flows to a decision block 96, wherein a determination is made to whether the new column name is not mapped. If the answer is yes (TRUE), a system field is added in a block 98, and the process exits.

If the new column name is mapped, a determination is made in a decision block 100 to whether the mapped column name is blank. If the answer is yes (TRUE), the logic proceeds to a decision block 102 in which a determination is made to whether the original field name is "Id." As discussed above, a field name of "Id" corresponds to a core application system Row ID column. The original field should not map to this type of column. Accordingly, if the answer to decision block 102 is yes (TRUE), an error code is returned in a return block 104. If the answer to decision block 102 is no (FALSE), the field is added as an empty calculated value in a block 106, and the process returns to the caller in a return block 108.

If the mapped column name is not blank, the logic proceeds to a block 110 in with the corresponding standard core application system name is assigned to the column. A determination is then made in a decision block 112 to whether the new column has a corresponding column definition in the repository table definition. If the answer is no (FALSE), the logic returns to decision block 102, and the operations provided by blocks 102, 104, and 106 are performed in the manner discussed above with reference to these blocks.

If the answer to decision block 112 is yes (TRUE), the column meta data is retrieved in a block 114. Next, the column data type is converted to a field data type of DTYPE_* in a block 116, and appropriate data is put in the field. The field is then added to the business component field array in a block 118.

Key Overrides/Modifications

It will be very likely that the primary keys of the core application system table and the legacy table that is substituted for it will not have the same primary keys. This creates a problem, since any tables related to the substituted legacy table (i.e., child tables) will include foreign keys that reference the primary key of the legacy table.

To address the problem, in one embodiment a primary key override business service is provided that overrides a normal primary key generation function corresponding to the core system and replaces it with the primary key generation scheme used by the legacy table. In one embodiment, a standard key generation class that is normally used to generate primary key values in the core application system is modified to invoke a custom key generation business service pertaining to a substituted table or set of tables into which new record data is to be inserted. The Business Component User Props in the repository is used to store the name of the business service and the method that needs to be invoked. The method will accept the table name corresponding to the table for which the key is to be generated and return the key in its output property set.

Figures 7, 13:
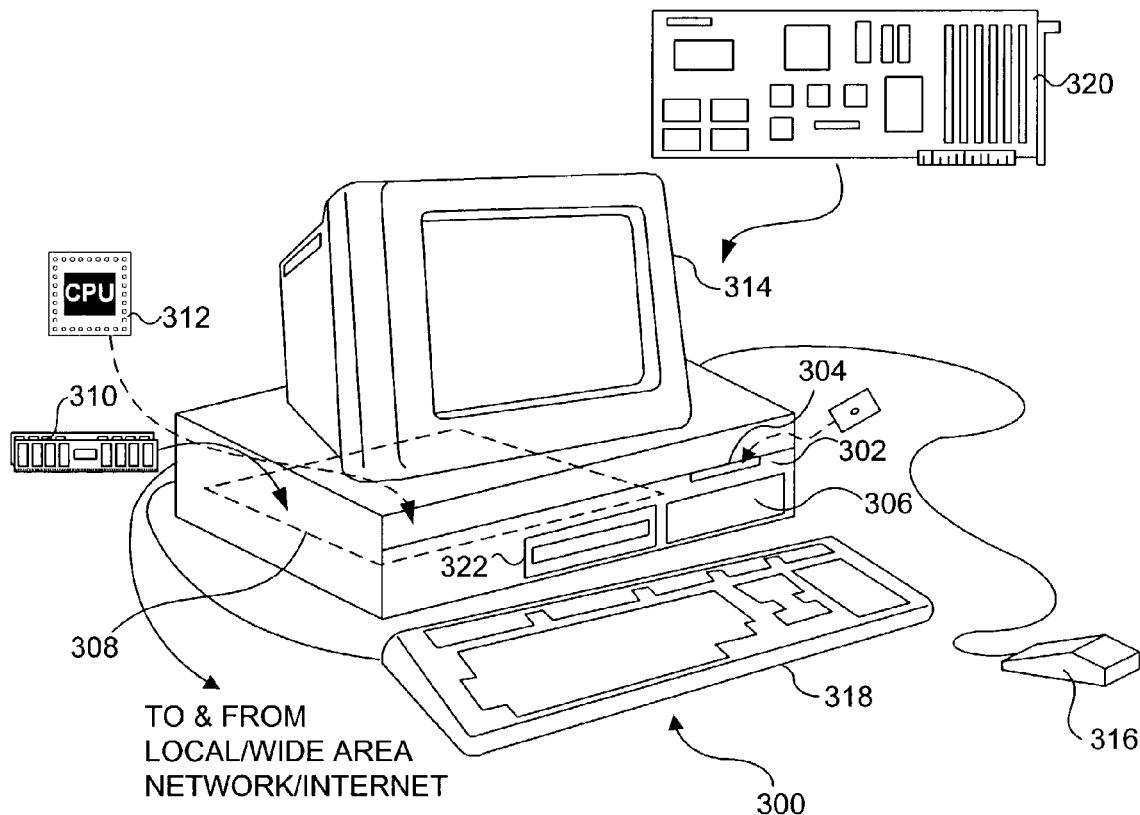
FIG. 7 is a structure diagram corresponding to a primary key generation override business service call.
FIG. 13 is a schematic diagram illustrating a computer system that may be used for implementing various aspects of the embodiments of the invention disclosed herein.

Typically, the primary key generation override (PKGO) business service operations will be configured by IT personnel as part of a Table Substitution implementation. One or more business services implementing the algorithms for key generation must be defined. The services may be written in Siebel VB (visual basic), Siebel eScript, or in C++ as a dynamic library. A method structure 120 corresponding to a typical PKGO business service is shown in FIG. 7. The services will export one or more arbitrarily named methods 122 with a string input argument 124 of TableName, and will return an output argument 126 named Key of type Hierarchy. For composite (i.e., multicolumn) keys, the first child property set of the output property set will contain a map of key field names to key values. As a shortcut, if the key is based on a single column, its value may be returned in the Key argument, without resorting to a child property set.

In the Business Component User Properties view each Business Component requiring custom key generation will be assigned a property in the following format:

Name: Key Generator
Value: <Business Service Name>.<Method Name>.

Figure 9:
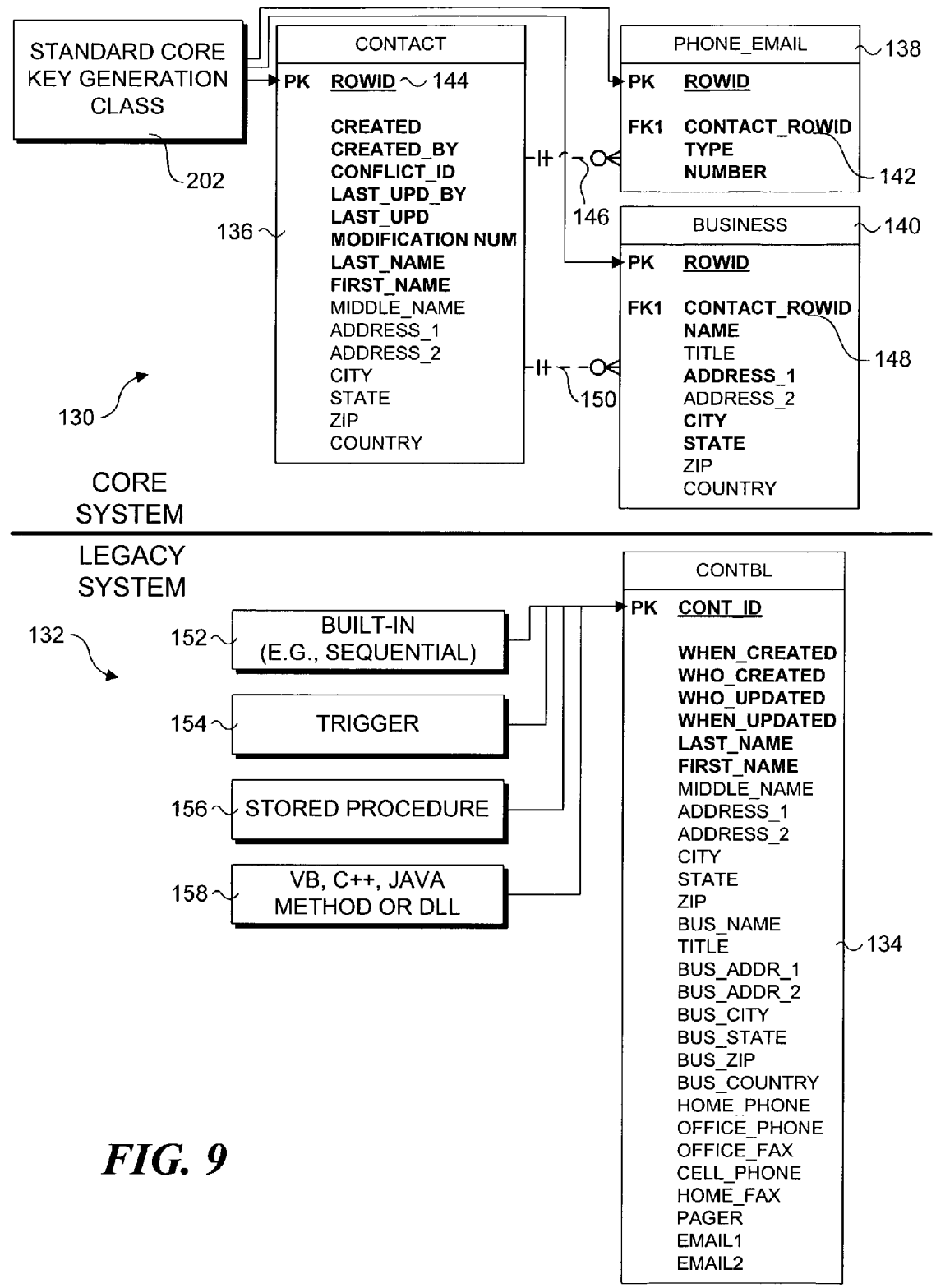
FIG. 9 is a schema diagram illustrating exemplary core system and legacy system schemas corresponding to a contact object.
Figure 10:
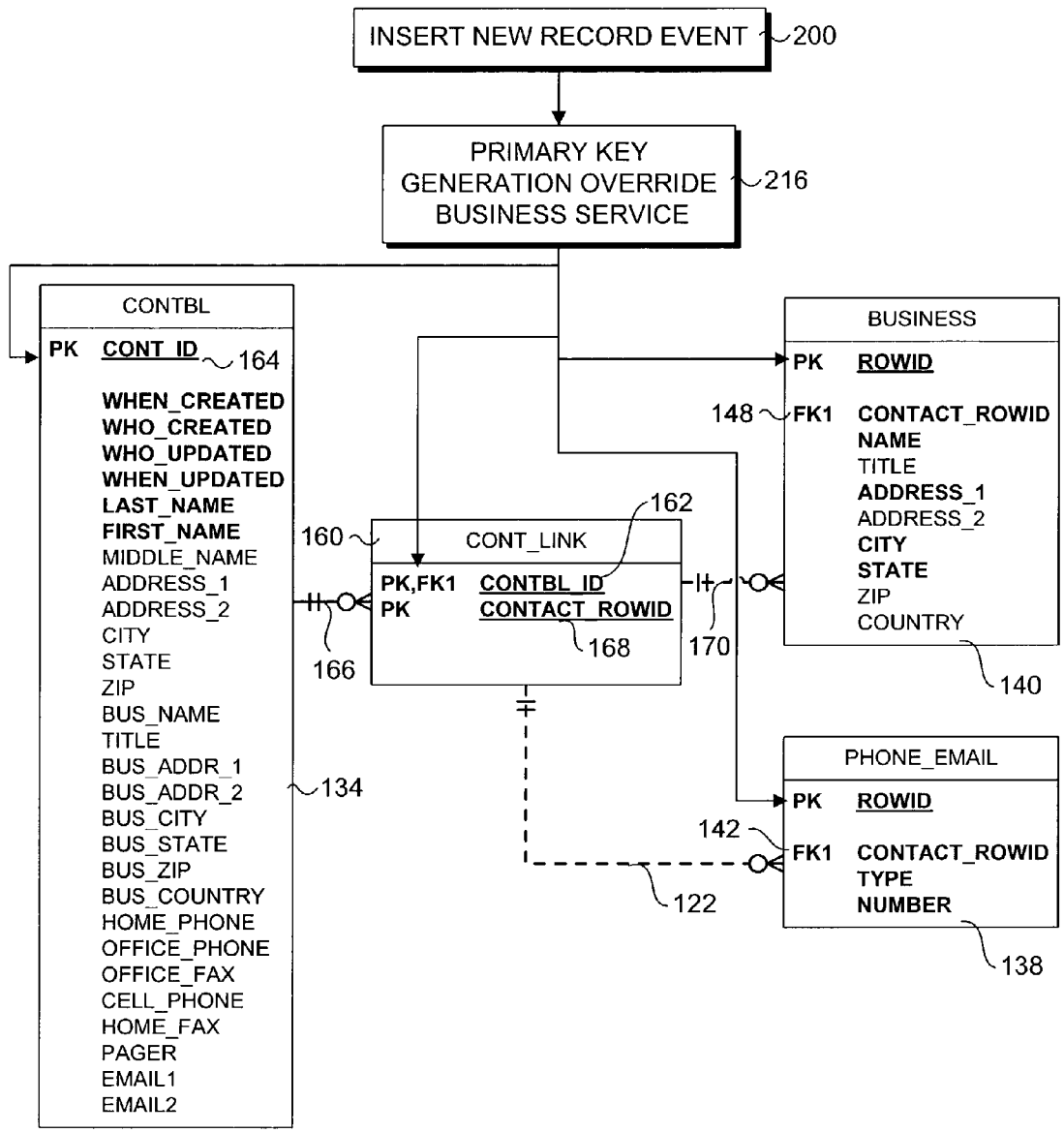
FIG. 10 is a schema diagram illustrating a composite schema that implements a substituted legacy base table that is linked to two core system child tables via a linking table.

An exemplary PKGO implementation pertaining to a contact object is now discussed with reference to the flow-chart of FIG. 8 and the database schema structures of FIGS. 9 and 10. In FIG. 9, exemplary database structures corresponding to a core system schema 130 and a legacy system schema 132 are depicted. In legacy system schema 132, data pertaining to the contact object are stored in a single CONTBL table 134. In core system schema 130, data pertaining to the contact object are stored in a set of three related tables, including a parent CONTACT table 136, a child PHONE_EMAIL table 138 and a child BUSINESS table 140. PHONE_EMAIL table 138 includes a CONTACT_ROWID foreign key column 142 that is linked to a ROWID primary key column 144 of CONTACT table 136 so as define a many-to-one relationship 146. Similarly, BUSINESS table 140 includes a CONTACT_ROWID foreign key column 148 so as to define a many-to-one relationship 150.

Typically, each table in the legacy system schema will include a primary key that will comprise one of a single column natural key, a multi-column natural key, or a single column surrogate key. Each primary key must comprise a unique value for a given table. For example, a social security number or 10-digit phone numbers are good candidates for natural primary keys because they are unique. Oftentimes surrogate keys are used to ensure uniqueness and because typical surrogate keys are easy to index. For instance, numerical surrogate keys are commonly used in "ID" primary key columns of tables. These numbers are typically generated by a sequential generator.

In some database servers, a surrogate key column can be defined that automatically generates a next sequential for each new row that is inserted into the table. This type of primary key generator is depicted as a built-in primary key generator 152. Another way to generate a surrogate key is to use a trigger 154. Typically, a "before insert" trigger will be used to generate a new surrogate key value before a row is inserted into a corresponding table. The surrogate key may be based on a sequence, or an algorithm may be used to generate a unique value based on values in various input fields. For instance, a surrogate key may comprise the concatenation of values from two or more columns. Although this might suggest that a multicolumn natural key might be a good primary key candidate for the table (since the concatenation is unique, the combination of the underlying columns must likewise be unique), a single-column surrogate primary key may still be used, since it simplifies linking relationships and queries that reference the table and related tables.

Another method for generating a primary key is to use a stored procedure 130. Basically, a stored procedure is similar to a conventional procedure, function, or method that is stored in the database instead of an external module or piece of code.

Each of the foregoing primary key generating schemes involves some sort of database-specific functionality. Specifically, built-in surrogate key sequencers, triggers, and stored procedures are all dependent on their underlying database server products. As a result, these mechanisms are not portable. In order to support portability, the sequencer or algorithm must be executed by code that is external to the database. This technique, which may typically comprise the use of a visual basic (VB), C++, Java or other programming language procedure or a corresponding dynamic link library (DLL) is depicted by an external method block 158 in FIG. 9. In short, the sequencer or algorithms used in an external method or DLL may be the same as that used in triggers or stored procedures. The primary difference is the portability—the same external method may be used with various SQL RDBMS database server products.

In essence, the PKGO business service is used to override the primary key generation facilities provided by the core system with the primary key generating mechanism used for the substituted legacy table in the legacy database schema. This is accomplished through either a call to an external method or DDL, generation of a new method that performs the same algorithm, or a call to a stored procedure. In the case of triggers and built-in sequencers, there is usually no need to call any method or procedure, as these facilities automatically handle primary key generation for newly inserted rows, regardless of the source of the data, including whether the data comes from an internal or external schema.

Figure 8:
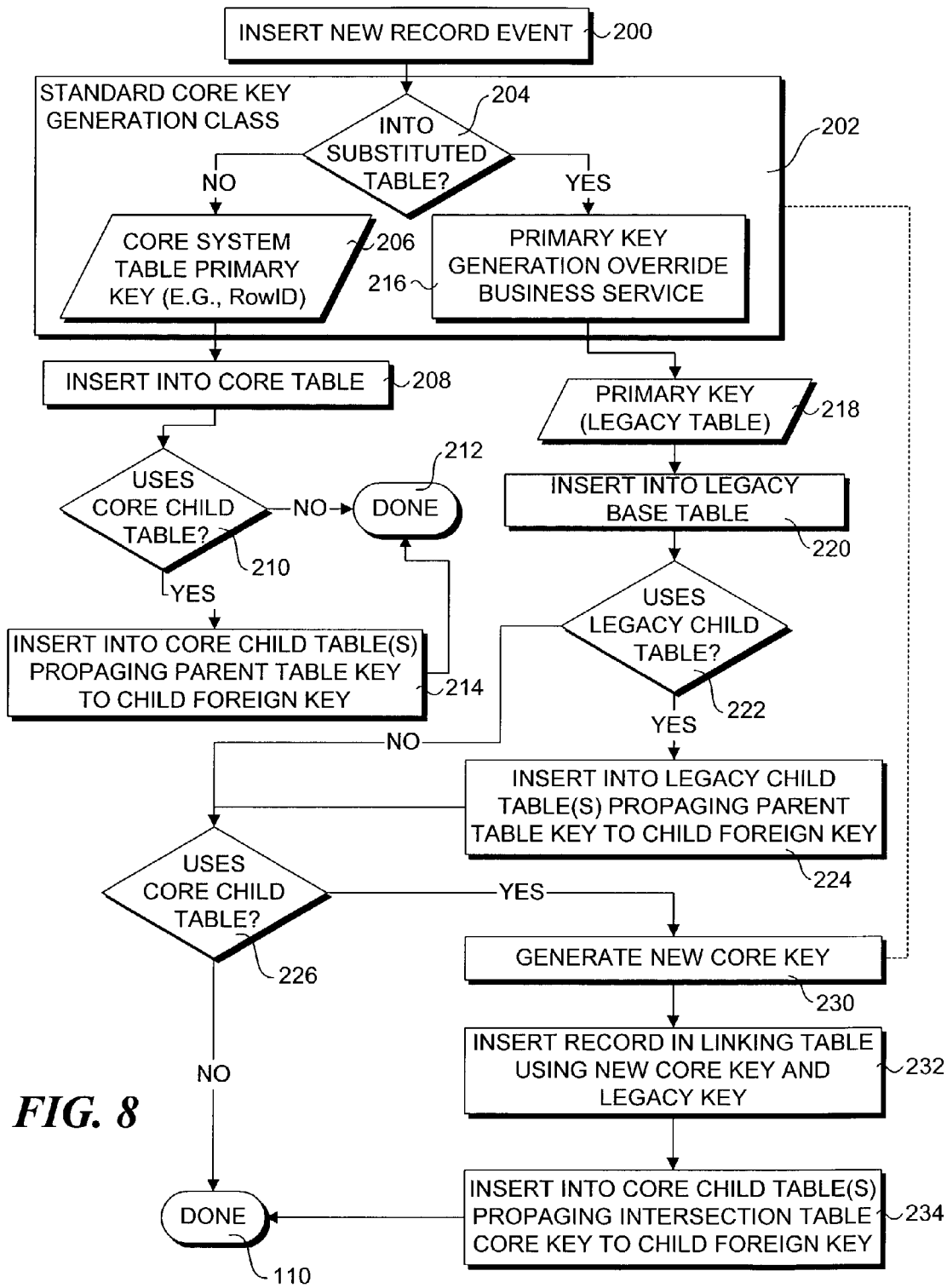
FIG. 8 is a flowchart illustrating the logic used by one embodiment of the invention when inserting a new record.

With reference to FIG. 8, the following operations are performed by one embodiment of the invention in response to an insert new record event 200 corresponding to a request to insert a new record. First, the logic proceeds to a standard core key generation class 202, which is normally used to generate primary keys for core tables. In a decision block 204 a determination is made to whether the new row is to be inserted into a substituted table. If the answer is no, the table comprises a normal core system table, and, accordingly, a normal primary key generation mechanism for the core system is used to generate a core system primary key 206. For example, in one embodiment, each core system primary key comprises a RowID column value generated by a predefined algorithm. The row is then inserted into the core system table in a block 208 using the newly generated core system primary key.

Next, the logic flows to a decision block 210 in which a determination is made to whether data pertaining to a portion of the new record is to be inserted into one or more child tables. For example, in accordance with core system schema 130, a new contact record would include portions inserted into not only CONTACT table 136 (the base or parent table), but each of child tables PHONE_EMAIL table 138, and BUSINESS table 140 as well. If not core child tables are to be used (i.e., the record data is inserted into a single base table), the record insertion process is done, as indicated by a block 212. If core child tables are used, appropriate record data is written to these tables in a block 214, wherein the newly generated primary key is propagated to the foreign key columns of the child tables. In one embodiment, the same RowID primary key generation facility is used to generate primary keys for the child tables as well, as depicted by standard core key generation class 202 in FIG. 9. At this point, the logic proceeds to block 212 completing the process.

If data is to be inserted into a substituted table, the standard key generation facilities are overwritten by having standard core key generation class 202 invoke an appropriate PKGO business service in a block 216 to generate a legacy table primary key 218. Typically, invoking the PKGO business service may launch a custom method that either includes an appropriate algorithm to generate a primary key in accordance with the primary key generation facility of the legacy table or itself calls an appropriate external method, DLL, or stored procedure corresponding to the legacy table primary key generation facility. For example, if a trigger or built-in primary key facility is used, the appropriate PKGO business service may simply comprise a null procedure that returns a predetermined value indicating success. In other instances, the custom method will include code corresponding to an appropriate key generation algorithm or include a call to the appropriate external method, DLL, or stored procedure.

Once the appropriate legacy table primary key is generated, a row of data corresponding to the new record is inserted into an appropriate legacy base table in a block 220. In a manner similar to that discussed above, the data for a given record type may be stored in a single legacy table, such as CONTBL 134 of FIG. 9, or it may comprise the use of legacy parent (base) table in combination with one or more child tables. Accordingly, a determination is made in a decision block 222 to whether any legacy child tables are to be used to store a portion of the new record. If the answer is yes, appropriate data are inserted into the legacy child table(s) in a block 224, wherein the value for legacy table primary key 218 is propagated to the foreign key columns of the child tables.

If the answer to decision block 222 is No (FALSE), or once the operations of block 224 have been completed, the logic next proceeds to a decision block 226, in which a determination is made to whether the core system uses child tables when records would normally be inserted into a parent table corresponding to the substituted legacy table, and there does not exist any legacy child tables that are substituted for the core system child tables. For example, as shown in FIG. 10, CONTBL table 134 now comprises a substituted table that is used to replace CONTACT table 144 in the core application system. In accordance with core system schema 130, respective portions of each contact record are stored in PHONE_EMAIL table 138 and BUSINESS table 140. Since there are no equivalent child tables in legacy system schema 132, these core child tables must be used to store the same portions of each contact record as they would store if CONTBL table 134 had not been substituted for CONTACT table 136.

This situation requires several considerations. First, there needs to be a way to link each of the child tables to the newly substituted legacy table. Since the foreign key columns of the child tables still will reference the primary key column of their parent table (e.g., a RowID column), which no longer is used, there needs to be a mechanism to properly link these child tables to the substituted legacy table, which now will act as a surrogate parent table to the core system child tables. This is enabled through an appropriate linking table, such as a linking table 160 shown in FIG. 10.

As the name implies, the linking table is used to link tables related to it to each other through foreign key-primary key relationships. Typically, the linking table will include a primary key comprising two or more columns. One of the columns will serve as a foreign key column to the new base table. For example, a CONTBL_ID column 162 serves as both one of the primary key columns and a foreign key column that is linked to a CONT_ID primary key column 164 of CONTBL table 134 to form a many-to-one relationship 166. The second primary key column is used to link the child tables to the linking table via foreign key columns in the child tables. Accordingly, the second primary key column should be named to (reasonably) correspond to these foreign key columns. For example, CONT_LINK table 160 includes a second primary key column 168 named CONTACT_ROWID. Each of BUSINESS table 140 and PHONE_EMAIL table 138 contain respective CONTACT_

ROWID foreign key columns 148 and 142, which where originally used to link these tables to CONTACT table 136, but are now used to defined many-to-one relationships 170 and 172, respectively between these child tables and CONT_LINK table 160. (It is noted that the primary key and foreign key columns do not need to share the same name; identical names are used in the foregoing example for clarity.) It will be appreciated that all linking tables will be defined prior to enabling new records to be inserted that require the use of such linking tables.

Returning to the flowchart of FIG. 8, if the answer to decision block 226 is No (FALSE), the record insertion process is complete, as identified by a block 228. In response to a yes (TRUE) result to decision block 226, the logic flows to a block 230 in which a new core table key is generated for the linking table. As illustrated in FIG. 8, in one embodiment this will involve the use of standard core key generation class 202 to generate the new key. In accordance with the composite schema of FIG. 10, the newly generated core key will correspond to CONTACT ROWID 168.

Both of the new core key and legacy table primary key 218 are then used in a block 232 to create a new record in the linking table. Appropriate record data portions are then inserted into any applicable core system child tables in a block 234, wherein the newly generated core key used in the intersection table is propagated to the foreign key columns of the child table(s). At this point, the record insertion process is complete.

Figure 11:
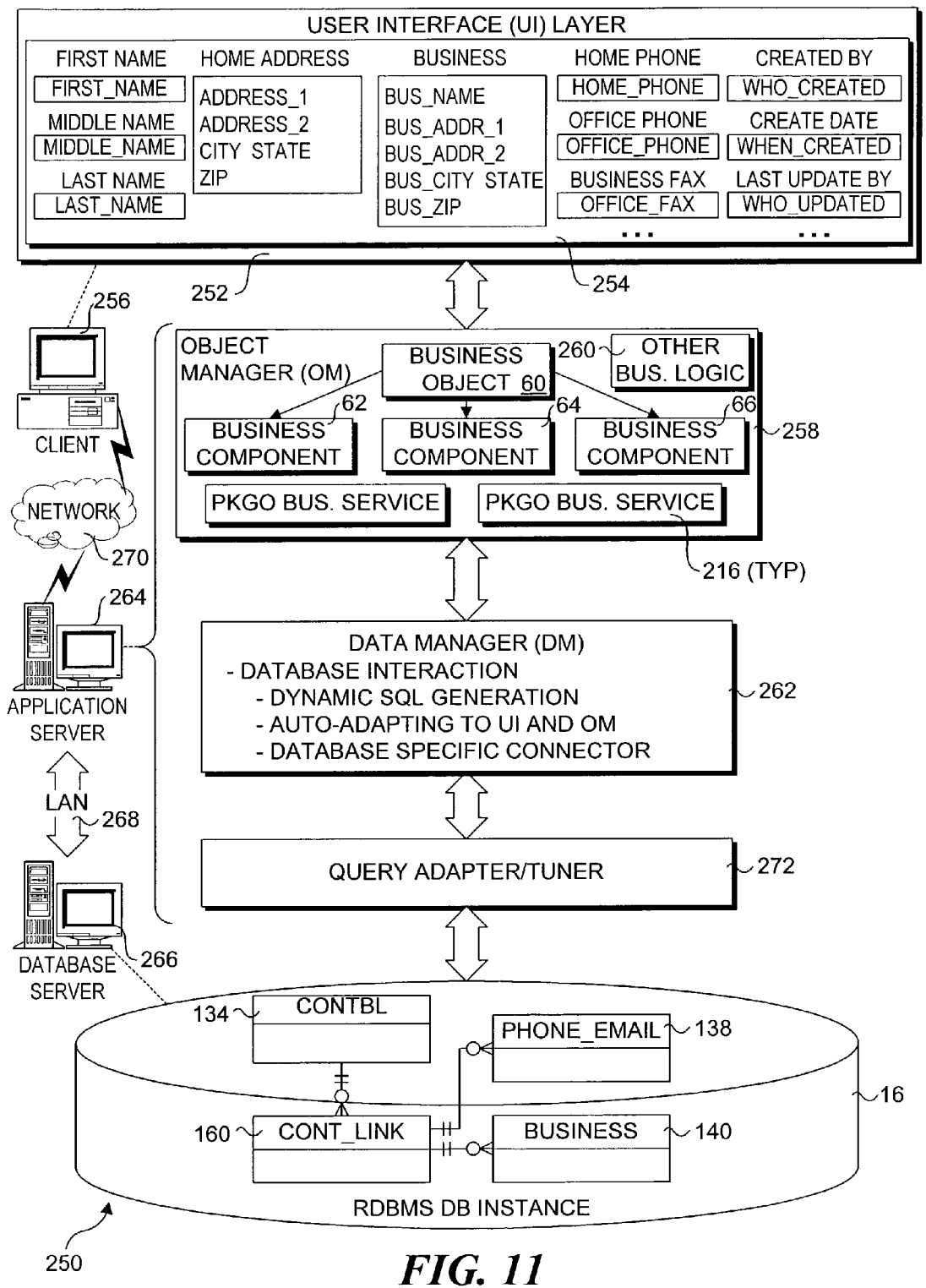
FIG. 11 is a multilevel architecture diagram corresponding to one embodiment of the invention.

A distributed multi-level architecture 250 corresponding to one embodiment of the invention is shown in FIG. 11. Multi-level architecture 250 includes several "logical" layers corresponding to various software components that are run on a distributed set of computers and servers. A user interface (UI) layer 252 corresponds to a top level of the architecture. UI layer 252 includes software components that handle the user interface aspects of the architecture, and may typically include various UI objects, including views, applets, forms, reports, etc. used in the various user interfaces of an application system, such as depicted by a form 254. Typically, software components corresponding to UI layer 252 will be run on a client computer 256, such as a desktop computer, laptop computer, workstation, etc. In one embodiment, the various UI objects are enabled through the use of a browser running on client computer 256.

At the next layer sits an Object Manager (OM) 258. The object manager contains the core of the business logic used to implement the embodiments of the invention disclosed herein, including business objects, business components, PKGO business services, and other business logic 260, such as scripting services. A data manager (DM) layer 262 sits below the OM layer, and is used to provide database interaction with a "backend" database layer, which corresponds to the lowest level of the architecture. The DM layer provides a database specific connector to the backend database, and dynamically generates SQL in response to data requests from OM layer 258.

The DM layer, in combination with the OM layer, provides a mapping between UI objects and where the data for those objects are stored. For example, the values in various fields in form 254 are mapped to corresponding table columns in RDBMS database instance 16. The combination of these layers also forms a layer of abstraction between UI layer 252 and the backend database layer such that the schema of the database can be changed without requiring any corresponding changes to UI objects in the UI layer.

In a typical implementation, software components corresponding to OM layer 258 and DM layer 262 will reside on one or more application servers 264, corresponding to a middleware layer in a well-known n-tier physical architecture. In correspondence with this architecture, the database layer will comprise an RDMBS database instance 16 running on a database server 266, which is connected to the one or more application servers 264 via a LAN connection 268. In general, client machines 256 will be connected to application servers 264 via a network connection 270, which may comprise a LAN, WAN, or Internet connection. In instances in which many clients connect to the system via the Internet, the n-tier architecture may include also include one or more web servers (not shown), which sit between the clients and the application servers.

Query Adapter/Tuner

As shown in FIG. 11, multi-level architecture 250 further includes a query adapter/tuner layer 272 that sits between data manager layer 262 and RDBMS database instance 16 in a "connection" layer. In normal core application system operations, this layer is not required. However, the implementation of substituted tables in place of core tables requires a query adapter component to modify the SQL queries generated by the data manager. Furthermore, the tuning aspects of the query adapter/tuner enable adapted queries that were originally tuned to correspond with the core system schema to be tuned to correspond to storage characteristics of the substituted tables in the legacy schema, as well as query parameters that are particular to the backend database server software hosting RDBMS database instance 16.

Figure 12:
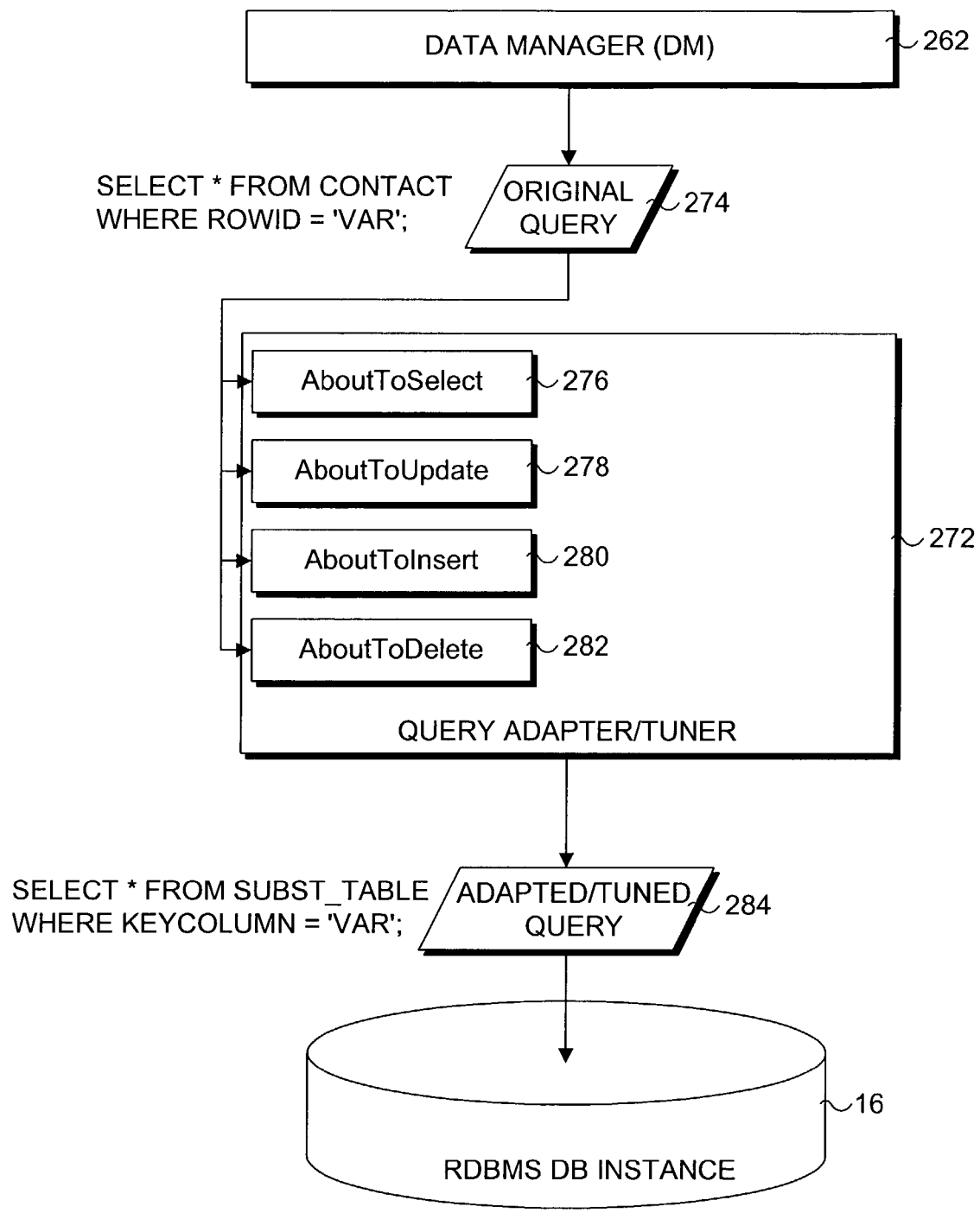
FIG. 12 is a block schematic diagram illustrating a query adapter/tuner component in accordance with one embodiment of the invention.

Further details of query adapter/tuner 272 are shown in FIG. 12. In one embodiment, the query adapter/tuner is implemented as a dynamic link library (DLL) that includes a TuneSQL function that is called upon detection of SELECT, INSERT, UPDATE, or DELETE queries pertaining to one or more substituted tables. The actual implementation of the query adapter/tuner will be specific to the schema of both the legacy and core application systems.

A typical process flow sequence implementing the query adapter/tuner begins when data manager 262 submits an original query 274 to RDBMS instance 16. If the query pertains to a substituted table, the TuneSQL function is called. Internally, the TuneSQL function will detect the type of SQL statement (SELECT, UPDATE, INSERT, DELETE) and will invoke an appropriate internal helper method, including an AboutToSelect helper method 276, and AboutToUpdate helper method 278, an AboutToInsert helper method 280, and an AboutToDelete helper method 280. Each helper method receives original query 274 in a string, and adapts and/or tunes the query statement based on internal rules defined for that method, thereby producing an adapted/tuned query 284 This query is then submitted to RDBMS database instance 16 for execution.

For example, suppose a core system would normally use a table named "CONTACT" having a primary key column of "ROWID," which has been substituted with a legacy system table named "SUBST_TABLE" having a primary key column of "KEYCOLUMN," wherein a majority of the substituted table columns are remapped to corresponding core table columns and visa-versa. Further suppose that an original query 274 seeks to retrieve a row from the CONTACT table having a ROWID value of an input variable "VAR." The original SQL query would look like:

SELECT*FROM CONTACT WHERE ROWID='VAR';

Since this is a SELECT query, it is handled by AboutToSelect helper method 276, which modifies the query to correspond with the table structure of the substituted SUBTABLE table as follows:

SELECT*FROM SUBST_TABLE WHERE KEYCOLUMN='VAR';

In this instance, the internal rule would comprise replace table name "CONTACT" with "SUBST_TABLE" and replace column name "ROWID" in table "CONTACT" with column name "KEYCOLUMN" in table "SUBST_TABLE."

The tuning aspect of the query tuner/adapter enables non-database server specific queries issued by the data manager to be tuned for: 1) particular indexes defined by the legacy system application schema; and 2) query parameters that are specific to a particular database server software product. As discussed above, the query tuner/adapter occupies the connection layer. This layer "connects" the layers above it to RDBMS database server instance 16, and, accordingly, comprises a connection that is specific to the RDBMS database server software product used to host the database server instance.

In general, each database server software product will include various tuning schemes, such as hints, to generate a desired query execution plan, wherein the tuning schemes are used to control how a query optimizer generates the query execution plan. For instance, the database software product may use one of two types of optimizers for a given query: 1) a rules-based optimizer; and 2) a cost-based optimizer. The rule-based optimizer formulates a query plan based on rules, such as "first rows" and "all rows" table access rules. The cost-based optimizer selects a query execution plan from among several execution plans that it generates, wherein each execution plan has an estimated "cost" (i.e., resource requirements), with the execution plan with the lowest cost being used to perform the query. Among other things, the cost-based optimizer uses table and index statistics (e.g., number of rows, average row length, number of distinct values for an index, etc.) in generating its execution plans. These statistics are used to formulate a decision tree of different execution plans, each with an estimated cost.

In general, the cost-based optimizer will generate faster execution plans than the rules-based optimizer, but not always. In either case, query execution plans generated by both of these optimizers may be tuned by using hints, which comprise text descriptors that are embedded in an SQL statement based on a predefined syntax. There are a wide variety of different hints that may be provided, including table access hints, index hints, parallel execution hints, etc. Generally, the use of the hints for a particular database server software product will be known to the database administrator (DBA) who manages the database server installation of the system.

Exemplary Computer System for Practicing the Invention

With reference to FIG. 13, a generally conventional computer 300 is illustrated, which is suitable for use as client machines, application servers, and database servers in connection with practicing the present invention, and may be used for running client and server-side software comprising one or more software modules that implement the various operations of the invention discussed above. Computer 300 is also intended to encompass various server architectures, as well as computers having multiple processors.

Computer 300 includes a processor chassis 302 in which are mounted a floppy disk drive 304, a hard drive 306, a motherboard 308 populated with appropriate integrated circuits including memory 310 and one or more processors (CPUs) 312, and a power supply (not shown), as are generally well known to those of ordinary skill in the art. It will be understood that hard drive 206 may comprise a single unit, or multiple hard drives, and may optionally reside outside of computer 300. A monitor 314 is included for displaying graphics and text generated by software programs and program modules that are run by the computer. A mouse 316 (or other pointing device) may be connected to a serial port (or to a bus port or USB port) on the rear of processor chassis 302, and signals from mouse 316 are conveyed to the motherboard to control a cursor on the display and to select text, menu options, and graphic components displayed on monitor 314 by software programs and modules executing on the computer. In addition, a keyboard 318 is coupled to the motherboard for user entry of text and commands that affect the running of software programs executing on the computer. Computer 300 also includes a network interface card 320 or built-in network adapter for connecting the computer to a computer network, such as a local area network, wide area network, or the Internet.

Computer 300 may also optionally include a compact disk-read only memory (CD-ROM) drive 322 into which a CD-ROM disk may be inserted so that executable files and data on the disk can be read for transfer into the memory and/or into storage on hard drive 306 of computer 300. Other mass memory storage devices such as an optical recorded medium or DVD drive may be included. The machine instructions comprising the software that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, all or a portion of the machine instructions may be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method for sharing data across a legacy application system and a core application system, comprising:
   remapping columns in a core application system table to corresponding columns in a legacy application system table, said legacy application table comprising a substituted table;
   performing core application system data operations that access the columns in the substituted table in place of the columns in the core application system table that are remapped, wherein
      the columns are remapped by performing the operations of
         selecting a table in the legacy data system to be used as a substituted table,
         selecting a table in the core application system table from which columns are to be remapped,
         determining a table structure of each of the substituted table and the core application system table, and
         defining a first business logic to remap the columns in the core application system table to corresponding columns in the substituted table based on the table structure of each respective table, the defining said first business logic comprises determining columns in the core application system table that are required by the core application system, for each of such columns, identifying a corresponding column in the substituted table containing similar data, and remapping any core application system objects that reference the core application system table column to hence forth map to the corresponding column in the substituted table that is identified, and a portion of the columns of the core application system table do not have a corresponding column in the substituted table that is identified; and defining a second business logic to create a pseudo column that appears to exist to the core application objects, but does not correspond to an actual column in the substituted table.

2. The method of claim 1, wherein the substituted table and core application system table are selected by identifying respective tables in the legacy application system and core application system containing similar data.

3. The method of claim 1, wherein the legacy application system is enabled to concurrently access the substituted table without requiring any changes a third to business logic that is used by the legacy application system.

4. The method of claim 1, wherein determining the table structure of the substituted table comprises:

generating a DDL (data definition language) file corresponding to a database schema used by the legacy application system;

parsing the DDL file looking for statements pertaining to the substituted table, including create table, view and index statements; and extracting basic SQL (structured query language) meta data from the DDL statements pertaining to the substituted table.

5. The method of claim 4, further comprising storing the basic SQL meta data in a repository accessible to the core application system.

6. The method of claim 4, further comprising:

defining respective DDL templates describing a DDL format particular to each of a plurality of database server software products;

enabling a user to identify a database server software product used by the legacy application system; and using the DDL template that is particular to that database server software product identified by the user to parse the DDL file.

7. The method of claim 1, further comprising defining business logic to reformat data having an original data type defined for the core application system column into a new data type corresponding to the substituted table column.

8. The method of claim 1, wherein the core application system provides a core primary key generation scheme for the core application system table that is being substituted for by the substituted table and the legacy application system provides a legacy primary key generation scheme for the substituted table, further comprising overriding the core primary key generation scheme with the legacy key generation scheme such that a new primary key in the substituted table is generated using the legacy primary key generation scheme in which a new record is inserted.

9. The method of claim 1, further comprising tuning a query corresponding to the substituted table so as to optimize the query, wherein the query is tuned based on tuning parameters pertaining to a database server used to host both the legacy application system and the core application system.

10. The method of claim 1, wherein the core application system is implemented with a multi-level software architecture comprising a user interface layer that includes a plurality of user-interface objects containing fields that enable users to interact with the core application system and an object manager layer that contains a third business logic that maps columns in the substituted table to corresponding fields in the user-interface objects.

11. The method of claim 10, wherein the multi-level software architecture further includes a data manager layer that interacts with the object manager layer and includes a fourth business logic to enable the core application system to access data using any one of a plurality of different database servers such that switching to a new database server does not require any modification to the fourth business logic in the object manager layer.

12. A method for sharing data across a legacy application system and a core application system, comprising:

remapping columns in a core application system table to corresponding columns in a legacy application system table, said legacy application table comprising a substituted table;

performing core application system data operations that access the columns in the substituted table in place of the columns in the core application system table that are remapped, wherein the columns are remapped by performing the operations of selecting a table in the legacy data system to be used as a substituted table, selecting a table in the core application system table from which columns are to be remapped, determining a table structure of each of the substituted table and the core application system table, and defining a first business logic to remap the columns in the core application system table to corresponding columns in the substituted table based on the table structure of each respective table, and the core application system provides a core primary key generation scheme for the core application system table that is being substituted for by the substituted table, and the legacy application system provides a legacy primary key generation scheme for the substituted table; and overriding the core primary key generation scheme with the legacy key generation scheme such that a new primary key in the substituted table is generated using the legacy primary key generation scheme in which a new record is inserted.

13. The method of claim 12, wherein the substituted table and core application system table are selected by identifying respective tables in the legacy application system and core application system containing similar data.

14. The method of claim 12, wherein the legacy application system is enabled to concurrently access the substituted table without requiring any changes to a second business logic that is used by the legacy application system.

15. The method of claim 12, wherein determining the table structure of the substituted table comprises:

generating a DDL (data definition language) file corresponding to a database schema used by the legacy application system;

parsing the DDL file looking for statements pertaining to the substituted table, including create table, view and index statements; and extracting basic SQL (structured query language) meta data from the DDL statements pertaining to the substituted table.

16. The method of claim 15, further comprising storing the basic SQL meta data in a repository accessible to the core application system.

17. The method of claim 15, further comprising:

defining respective DDL templates describing a DDL format particular to each of a plurality of database server software products;

enabling a user to identify a database server software product used by the legacy application system; and using the DDL template that is particular to that database server software product identified by the user to parse the DDL file.

18. The method of claim 12, wherein the act of defining said first defining business logic to remap columns in the core application system table to corresponding columns in the substituted table comprises:

determining columns in the core application system table that are required by the core application system;

for each of such columns, identifying a corresponding column in the substituted table containing similar data; and remapping any core application system objects that reference the core application system table column to hence forth map to the corresponding column in the substituted table that is identified.

19. The method of claim 18, wherein a portion of the columns of the core application system table do not have a corresponding column in the substituted table, further comprising:

defining a second business logic to create a pseudo column that appears to exist to the core application objects, but doesn't correspond to an actual column in the substituted table.

20. The method of claim 18, further comprising defining a second business logic to reformat data having a new data type defined for the core application system column into a new data type corresponding to the substituted table column.

21. The method of claim 12, further comprising tuning a query corresponding to the substituted table so as to optimize the query, wherein the query is tuned based on tuning parameters pertaining to a database server used to host both the legacy application system and the core application system.

22. The method of claim 12, wherein the core application system is implemented with a multi-level software architecture comprising a user interface layer that includes a plurality of user-interface objects containing fields that enable users to interact with the core application system and an object manager layer that contains a third business logic that maps columns in the substituted table to corresponding fields in the user-interface objects.

23. The method of claim 22, wherein the multi-level software architecture further includes a data manager layer that interacts with the object manager layer and includes logic to enable the core application system to access data using any one of a plurality of different database servers such that switching to a new database server does not require any modification to the business logic in the object manager layer.

24. A computer program product for sharing data across a legacy application system and a core application system, comprising:

a first set of instructions, executable on a computer system, configured to remap columns in a core application system table to corresponding columns in a legacy application system table, said legacy application table comprising a substituted table;

a second set of instructions, executable on said computer system, configured to perform core application system data operations that access the columns in the substituted table in place of the columns in the core application system table that are remapped, wherein the second set of instructions further comprise a first subset of instructions, executable on said computer system, the first subset of instructions are configured to remap the columns by virtue of comprising a first sub-subset of instructions, executable on said computer system, configured to select a table in the legacy data system to be used as a substituted table, a second sub-subset of instructions, executable on said computer system, configured to select a table in the core application system table from which columns are to be remapped, a third sub-subset of instructions, executable on said computer system, configured to determine a table structure of each of the substituted table and the core application system table, and a fourth sub-subset of instructions, executable on said computer system, configured to define a first business logic to remap the columns in the core application system table to corresponding columns in the substituted table based on the table structure of each respective table, the fourth sub-subset of instructions comprise a first sub-sub-subset of instructions, executable on said computer system, configured to determine columns in the core application system table that are required by the core application system, a second sub-sub-subset of instructions, executable on said computer system, configured to identify a corresponding column in the substituted table containing similar data, for each of such columns, and a third sub-sub-subset of instructions, executable on said computer system, configured to remap any core application system objects that reference the core application system table column to hence forth map to the corresponding column in the substituted table that is identified, and a portion of the columns of the core application system table do not have a corresponding column in the substituted table that is identified;

a third set of instructions, executable on said computer system, configured to defining a second business logic to create a pseudo column that appears to exist to the core application objects, but does not correspond to an actual column in the substituted table; and computer readable storage media, wherein said computer program product is encoded in said computer readable storage media.

25. A computer program product for sharing data across a legacy application system and a core application system, comprising:
- a first set of instructions, executable on a computer system, configured to remap columns in a core application system table to corresponding columns in a legacy application system table, said legacy application table comprising a substituted table;
- a second set of instructions, executable on said computer system, configured to perform core application system data operations that access the columns in the substituted table in place of the columns in the core application system table that are remapped, wherein
  - the second set of instructions further comprise a first subset of instructions, a second subset of instructions and a third subset of instructions, each executable on said computer system,
  - the first subset of instructions are configured to remap the columns by virtue of comprising
    - a first sub-subset of instructions, executable on said computer system, configured to select a table in the legacy data system to be used as a substituted table,
    - a second sub-subset of instructions, executable on said computer system, configured to select a table in the core application system table from which columns are to be remapped,
    - a third sub-subset of instructions, executable on said computer system, configured to determine a table structure of each of the substituted table and the core application system table, and
    - a fourth sub-subset of instructions, executable on said computer system, configured to define a first business logic to remap the columns in the core application system table to corresponding columns in the substituted table based on the table structure of each respective table,
  - the second subset of instructions are configured to cause the core application system to provide a core primary key generation scheme for the core application system table that is being substituted for by the substituted table, and
  - the third subset of instructions are configured to cause the legacy application system to provide a legacy primary key generation scheme for the substituted table;
- a third set of instructions, executable on said computer system, configured to override the core primary key generation scheme with the legacy key generation scheme such that a new primary key in the substituted table is generated using the legacy primary key generation scheme in when a new record is inserted; and
- computer readable storage media, wherein said computer program product is encoded in said computer readable storage media.

* * * * *